(12) United States Patent
Gan et al.

(10) Patent No.: US 7,108,942 B1
(45) Date of Patent: Sep. 19, 2006

(54) EFFICIENT ELECTRODE ASSEMBLY DESIGN FOR CELLS WITH ALKALI METAL ANODES

(75) Inventors: Hong Gan, Williamsville, NY (US); Esther S. Takeuchi, East Amherst, NY (US)

(73) Assignee: Wilson Greatbatch Technologies, Inc., Clarence, NY (US)

(*) Notice: Subject to any disclaimer, the term of this patent is extended or adjusted under 35 U.S.C. 154(b) by 211 days.

(21) Appl. No.: 10/807,358

(22) Filed: Mar. 23, 2004

Related U.S. Application Data

(60) Provisional application No. 60/458,173, filed on Mar. 27, 2003.

(51) Int. Cl.
*H01M 10/36* (2006.01)
*H01M 4/52* (2006.01)

(52) U.S. Cl. ............... 429/169; 429/211; 429/231.95; 429/179

(58) Field of Classification Search ........... 429/231.95, 429/218.1, 231.1, 211, 169, 179, 623.1, 121, 429/127, 163, 164, 168; 29/623.1
See application file for complete search history.

(56) References Cited

U.S. PATENT DOCUMENTS

| | | | |
|---|---|---|---|
| 3,885,991 A | 5/1975 | Finkel | |
| 4,687,717 A | 8/1987 | Kaun et al. | |
| 4,830,940 A | 5/1989 | Keister et al. | |
| 4,964,877 A | 10/1990 | Keister et al. | |
| 5,147,737 A | 9/1992 | Post et al. | |
| 5,254,415 A | 10/1993 | Williams et al. | |
| 5,439,760 A | 8/1995 | Howard et al. | |
| 5,441,824 A | 8/1995 | Rippel | |
| 5,595,839 A | 1/1997 | Hossain | |
| 5,618,318 A | 4/1997 | Reddy et al. | |
| 5,631,102 A | 5/1997 | Spillman et al. | |
| 5,667,909 A | 9/1997 | Rodriguez et al. | |
| 5,716,422 A | 2/1998 | Muffoletto et al. | |
| 6,551,747 B1 | 4/2003 | Gan | |
| 6,566,007 B1 * | 5/2003 | Takeuchi et al. | ............ 429/219 |
| 6,645,670 B1 | 11/2003 | Gan | |
| 6,849,357 B1 * | 2/2005 | Kasahara et al. | ............ 429/163 |
| 2002/0018928 A1 * | 2/2002 | Hallifax et al. | ............... 429/94 |

* cited by examiner

*Primary Examiner*—Patrick Joseph Ryan
*Assistant Examiner*—Monique Wills
(74) *Attorney, Agent, or Firm*—Michael F. Scalise

(57) ABSTRACT

Electrochemical cells having the casing as part of the anode current collector are described. In particular, the anode is divided into two sections. In one section, lithium metal is pressed directly into contact with the inner surface of the casing. No anode current collector is needed in this section. In the other section, the anode is fabricated in a conventional manner in which lithium metal is pressed on to both sides of an anode current collector. Cathode materials can be, but are not limited to, SVO, CSVO, $MnO_2$, $Li_xCoO_2$, $Li_xNiO_2$, $Li_xMn_2O_4$, $V_2O_5$, $CF_x$, and mixtures thereof. Several non-active components are limited in this manner including an insulator bag, two layers of anode current collector and two layers of separator.

17 Claims, 2 Drawing Sheets

EFFICIENT ELECTRODE ASSEMBLY DESIGN FOR CELLS WITH ALKALI METAL ANODES

CROSS REFERENCE TO RELATED APPLICATION

The present application claims priority from provisional application Ser. No. 60/458,173, filed Mar. 27, 2003.

BACKGROUND OF THE INVENTION

Implantable ventricular cardiac defibrillators typically use lithium/silver vanadium oxide (Li/SVO) electrochemical cells as their power source. For the implantable medical device itself, it is preferable that the device be relatively small in size, quick in response to the patient's medical needs, promote long device service life, and the like. Therefore, when cells are built for implantable medical applications, special electrode assembly designs are needed to meet all of these requirements. Additionally, for cells powering cardiac defibrillators, a large electrode surface area is required to provide the needed power capability. An efficient cell package is also needed to achieve the highest capacity in the smallest volume.

In a conventional electrode assembly for Li/SVO cells, the cathode active material is pressed, coated or otherwise contacted to both sides of a foil or screen cathode current collector to provide the cathode electrode. Lithium as the anode active material in the form of a foil is pressed onto both sides of an anode current collector to form the anode electrode. The anode and the cathode electrodes are then placed against each other with one or two layers of intermediate separator material. The final electrode assembly is typically in the form of a prismatic plate design or a jellyroll design. An example of the conventional prismatic plate design is disclosed in U.S. Pat. No. 5,147,737 to Post et al. An example of a conventional jellyroll design is disclosed in U.S. Pat. No. 5,439,760 to Howard et al. To further illustrate this point, FIG. 1 shows a conventional prismatic or jellyroll electrode assembly. The electrode assembly 10 includes an anode electrode 12 and a cathode electrode 14 segregated from each other by separator sheets 16. The anode electrode comprises an anode active material 18, such as lithium, contacted to both sides of an anode current collector 20, such as of nickel. The cathode electrode 14 comprises a cathode active material 22 contacted to both sides of a cathode current collector 24, such as of titanium. The outermost winds or plates are of an anode electrode directly adjacent to a casing sidewall 26. Separator sheets 16 reside between the electrode units and the outermost anode electrode structures. Finally, the entire electrode assembly is contained in a polymeric insulator bag 28 that is then inserted into the casing 26.

The anode electrode is electrically connected to the conductive casing 26 as the negative electrode terminal. The cathode electrode is electrically connected to a terminal lead insulated from the casing by a glass-to-metal seal (not shown). The general structure of a glass-to-metal seal is well know by those skilled in the art and does not necessarily form a basis for the present invention.

Since the electrode assembly thickness is the sum of the thickness of each component, the fewer the non-active component layers, the more volume for the active components and, consequently, the higher the cell's volumetric capacity. Therefore, the packaging efficiency of the prior art electrode assembly can be further improved by having the casing wall serve as part of the anode current collector.

SUMMARY OF THE INVENTION

The present invention improves the performance of lithium electrochemical cells by providing a new electrode assembly based on a convention prismatic or jelly roll configuration. Regardless of whether the cell is built in a case-positive or a case-negative design, the casing sidewalls serve as part of the anode or the cathode current collector, respectively. This eliminates some of the non-active or passive material of the conventional cell designs. The present cells are particularly useful for powering implantable medical devices, such as a cardiac defibrillator, pacemakers, implantable drug pumps, and the like.

These and other aspects and advantages of the present invention will become increasingly more apparent to those skilled in the art by reference to the following description.

DETAILED DESCRIPTION OF THE INVENTION

Figure 1:
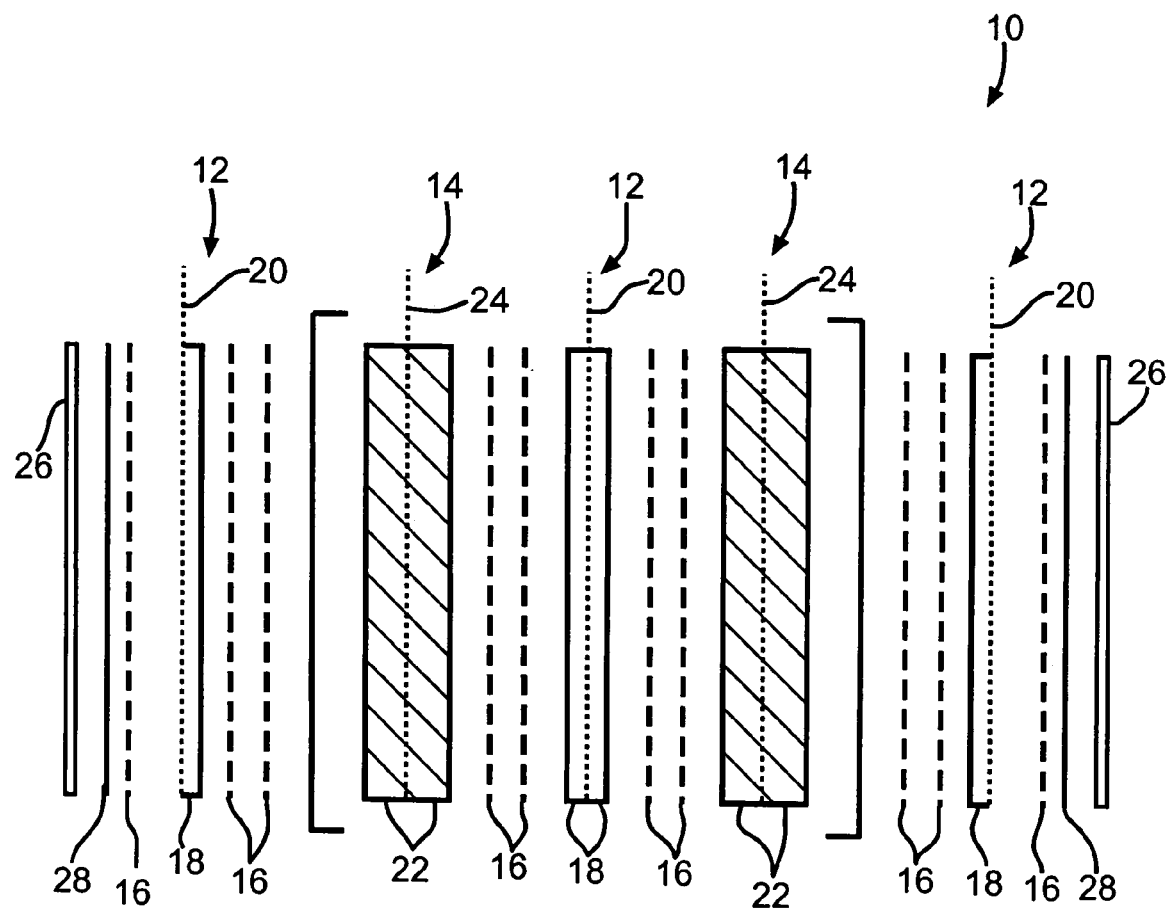
FIG. 1 is a cross-sectional view of a prior art electrochemical cell including either a prismatic plate or a jellyroll electrode assembly.

An electrochemical cell according to the present invention must have sufficient energy density and discharge capacity in order to be a suitable power source for implantable medical devices. Such cells comprise an anode of a metal selected from Groups IA, IIA and IIIB of the Periodic Table of the Elements. These anode active materials include lithium, sodium, potassium, etc., and their alloys and intermetallic compounds including, for example, Li—Si, Li—Al, Li—B and Li—Si—B alloys and intermetallic compounds. The preferred anode comprises lithium. An alternate anode comprises a lithium alloy such as a lithium-aluminum alloy. The greater the amounts of aluminum present by weight in the alloy, however, the lower the energy density of the cell.

The form of the anode may vary, but preferably it is a thin metal sheet or foil of the anode metal, pressed or rolled on a metallic anode current collector, i.e., preferably comprising titanium, titanium alloy or nickel, to form an anode component. Copper, tungsten and tantalum are also suitable materials for the anode current collector. In the exemplary cell of the present invention, the anode component has an extended tab or lead of the same material as the anode current collector, i.e., preferably nickel or titanium, integrally formed therewith such as by welding and contacted by a weld to a cell case of conductive metal in a case-negative electrical configuration. Alternatively, the anode may be formed in some other geometry, such as a bobbin shape, cylinder or pellet to allow an alternate low surface cell design.

The electrochemical cell of the present invention further comprises a cathode of electrically conductive material that serves as the other or counter electrode. The cathode is preferably of solid materials and the electrochemical reaction at the cathode involves conversion of ions that migrate from the anode to the cathode into atomic or molecular forms. The solid cathode may be of a carbonaceous chemistry or comprise a metal element, a metal oxide, a mixed metal oxide, a metal sulfide, and combinations thereof. The metal oxide, the mixed metal oxide and the metal sulfide are formed by the chemical addition, reaction, or otherwise intimate contact of various metal oxides, metal sulfides and/or metal elements, preferably during thermal treatment, sol-gel formation, chemical vapor deposition or hydrothermal synthesis in mixed states. The active materials thereby produced contain metals, oxides and sulfides of Groups, IB, IIB, IIIB, IVB, VB, VIIB, VIIB and VIII, which includes the noble metals and/or other oxide and sulfide compounds. A preferred cathode active material is a reaction product of at least silver and vanadium.

One preferred mixed metal oxide is a transition metal oxide having the general formula $SM_xV_2O_y$, where SM is a metal selected from Groups IB to VIIB and VIII of the Periodic Table of Elements, wherein x is about 0.30 to 2.0 and y is about 4.5 to 6.0 in the general formula. By way of illustration, and in no way intended to be limiting, one exemplary cathode active material comprises silver vanadium oxide having the general formula $Ag_xV_2O_y$, in any one of its many phases, i.e., β-phase silver vanadium oxide having in the general formula x=0.35 and y=5.8, γ-phase silver vanadium oxide having in the general formula x=0.80 and y=5.40 and ε-phase silver vanadium oxide having in the general formula x=1.0 and y=5.5, and combinations and mixtures of phases thereof. For a more detailed description of such cathode active materials reference is made to U.S. Pat. No. 4,310,609 to Liang et al., which is assigned to the assignee of the present invention and incorporated herein by reference.

Another preferred composite transition metal oxide cathode active material is copper silver vanadium oxide (CSVO), which is described U.S. Pat. No. 5,472,810 to Takeuchi et al. and U.S. Pat. No. 5,516,340 to Takeuchi et al. Both are assigned to the assignee of the present invention and incorporated herein by reference.

Another cathode active material is a carbonaceous compound prepared from carbon and fluorine, which includes graphitic and nongraphitic forms of carbon, such as coke, charcoal or activated carbon. Fluorinated carbon is represented by the formula $(CF_x)_n$ wherein x varies between about 0.1 to 1.9 and preferably between about 0.5 and 1.2, and $(C_2F)_n$ wherein the n refers to the number of monomer units which can vary widely.

Additional cathode active materials include $V_2O_5$, $MnO_2$, $LiCoO_2$, $LiNiO_2$, $LiMn_2O_4$, $TiS_2$, $Cu_2S$, FeS, $FeS_2$, $Ag_2O$, $Ag_2O_2$, $CuF_2$, $Ag_2CrO_4$, copper oxide, copper vanadium oxide, and mixtures thereof.

Before fabrication into an electrochemical cell, the cathode active material is preferably mixed with a binder material such as a powdered fluoro-polymer; more preferably powdered polytetrafluoroethylene or powdered polyvinylidene flouride present at about 1 to about 5 weight percent of the cathode mixture. Further, up to about 10 weight percent of a conductive diluent is preferably added to the cathode mixture to improve conductivity. Suitable materials for this purpose include acetylene black, carbon black and/or graphite or a metallic powder such as powdered nickel, aluminum, titanium and stainless steel. The preferred cathode active mixture thus includes a powdered fluoro-polymer binder present at about 3 weight percent, a conductive diluent present at about 3 weight percent and about 94 weight percent of the cathode active material.

Cathode components for incorporation into an electrochemical cell according to the present invention may be prepared by rolling, spreading or pressing the cathode active materials onto a suitable current collector selected from the group consisting of stainless steel, titanium, tantalum, platinum, gold, aluminum, cobalt nickel alloys, nickel-containing alloys, highly alloyed ferritic stainless steel containing molybdenum and chromium, and nickel-, chromium- and molybdenum-containing alloys. The preferred current collector material is titanium. When the active material is a fluorinated carbon, the titanium cathode current collector has a thin layer of graphite/carbon material, iridium, iridium oxide or platinum applied thereto. Cathodes prepared as described above may be in the form of one or more plates operatively associated with at least one or more plates of anode material, or in the form of a strip wound with a corresponding strip of anode material in a structure similar to a "jellyroll".

In order to prevent internal short circuit conditions, the cathode is separated from the Group IA, IIA or IIIB anode by a suitable separator material. The separator is of electrically insulative material, and also is chemically unreactive with the anode and cathode active materials and both chemically unreactive with and insoluble in the electrolyte. In addition, the separator material has a degree of porosity sufficient to allow flow there through of the electrolyte during the electrochemical reaction of the cell. Illustrative separator materials include fabrics woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, a polytetrafluoroethylene membrane commercially available under the designation ZITEX (Chemplast Inc.), a polypropylene membrane commercially available under the designation CELGARD (Celanese Plastic Company, Inc.), a membrane commercially available under the designation DEXIGLAS (C.H. Dexter, Div., Dexter Corp.), and a membrane commercially available under the designation TONEN.

Figure 2:
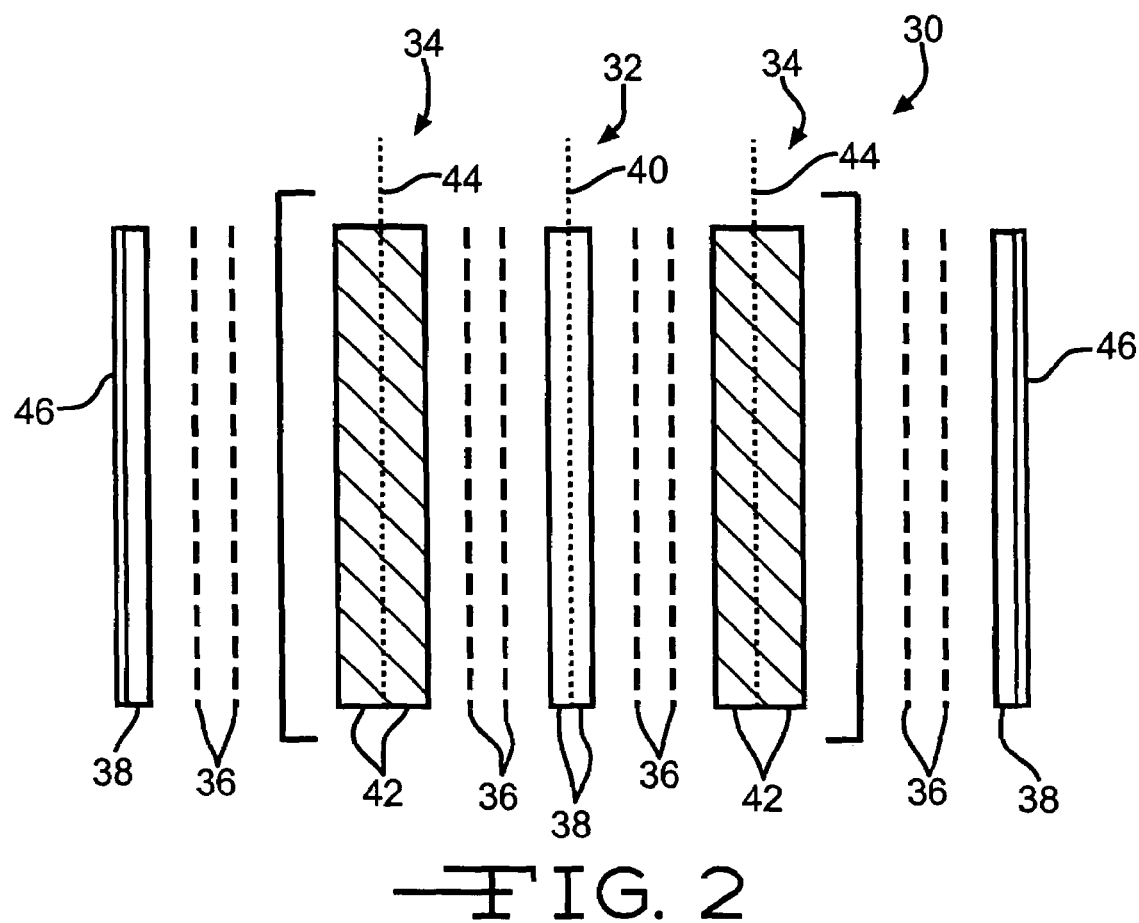
FIG. 2 is a cross-sectional view of a present invention electrochemical cell including either a prismatic plate or a jellyroll electrode assembly.

FIG. 2 shows a prismatic or jellyroll electrode assembly according to the present invention. The electrode assembly 30 includes an anode electrode 32 and a cathode electrode 34 segregated from each other by separator sheets 36. The anode electrode preferably comprises lithium 38 contacted to both sides of a nickel anode current collector 40. The cathode electrode 34 comprises one or more of the previously described cathode active materials 42 contacted to both sides of a cathode current collector 44, such as of titanium. The outermost winds or plates are of an anode electrode directly adjacent to a casing sidewall 46. Separator sheets 36 reside between the electrode units and the outermost anode electrodes.

Unlike the conventional cell construction shown in FIG. 1, the outermost anode electrodes use the casing sidewalls 46 as part of their current collector. In a jellyroll electrode assembly, a lithium foil is press contacted to at least one side of an anode current collector. A portion of the lithium foil extends out beyond an edge of the anode current collector. This portion is then press contacted to the inner surface of the casing sidewalls. In a prismatic design, one of the plates without a current collector is contacted to the inner surface of the casing sidewall.

Referring back to FIG. 1, in a conventional prismatic or jellyroll electrode assembly in a case-negative cell design, there are n≧1 electrode units of cathode electrode/separator/anode electrode/separator/cathode electrode. This is shown where n=1, 2, 3, 4, 5, etc. In this cell design, the number of layers for each component is calculated as:

no. of cell case wall 26 layers=2
no. of insulator bag 28 layers=2
no. of separator 16 layers=4n+6
no. of anode material 18 layers=2n+2
no. of anode current collector 20 layers=n+2
no. of cathode material 22 layers=4n
no. of cathode current collector 24 layers=2n Thus, assuming n=1 in FIG. 1, there are two casing wall 26 layers, two insulator bag 28 layers, ten separator 16 layers, six anode lithium 18 layers, three anode current collector 20 layers, four cathode active material 22 layers, and two cathode current collector 24 layers.

As shown in FIG. 2, in the present invention cells, whether of a prismatic or a jellyroll case-negative design, there are $n \geq 1$ electrode units of cathode electrode/separator/anode electrode/separator/cathode electrode where n 1, 2, 3, 4, 5, etc. However, since the casing sidewall serves as part of the anode electrode current collector, there are two less layers of insulator bag, two less layers of separator, and two less anode current collector screens. In this cell design, the number of layers for each component is calculated as:
no. of cell case wall 46 layers=2
no. of separator 36 layers=4n+4
no. of anode material 38 layers=2n+2
no. of anode current collector 40 layers=n
no. of cathode material 42 layers=4n
no. of cathode current collector 44 layers=2n This means that the volumetric energy density of cells according to the present invention is higher than that of cells having the conventional electrode assembly shown in FIG. 1. This also holds true for cells built in a case-positive design having the casing sidewalls serving as part of the cathode current collector.

In a case-negative design, since lithium is the best heat conductor in the electrode assembly, including the cathode active material, electrolyte, separator, and insulator bag, contact between the lithium metal and the casing sidewall allows for more efficient heat dissipation from the cell to the ambient environment under abusive conditions. This includes short circuit or over charge and over discharge conditions. As a result, the cell of the present invention is relatively safer than the cell with the conventional electrode design shown in FIG. 1.

In a case-positive design, the cathode active material is contacted to the casing by any one of a number of techniques including pressing a powdered mixture of the cathode active mixture to the inner surface of the sidewalls. Other means include forming a freestanding sheet of the cathode active mixture as described in U.S. Pat. Nos. 5,435,874 and 5,571,640, both to Takeuchi et al., that is then press contacted to the inner surface of the casing sidewalls, or by a thermal spray deposited technique, as described in U.S. Pat. No. 5,716,422 to Muffoletto et al. These patents are assigned to the assignee of the present invention and incorporated herein by reference. In either the jellyroll or prismatic electrode assembly, there is a conductor extending from the casing sidewall or the electrode active material contacted thereto, whether of the anode or the cathode, to the other portions of the same polarity electrode not in direct contact with the casing.

The electrochemical cell further includes a nonaqueous, ionically conductive electrolyte that serves as a medium for migration of ions between the anode and the cathode electrodes during electrochemical reactions of the cell. The electrochemical reaction at the electrodes involves conversion of ions in atomic or molecular forms that migrate from the anode to the cathode. Thus, the nonaqueous electrolyte is substantially inert to the anode and cathode materials, and exhibits those physical properties necessary for ionic transport, namely, low viscosity, low surface tension and wettability.

A suitable electrolyte has an inorganic, ionically conductive salt dissolved in a nonaqueous solvent, and more preferably, an ionizable alkali metal salt dissolved in a mixture of aprotic organic solvents comprising a low viscosity solvent and a high permittivity solvent. The salt serves as the vehicle for migration of the anode ions to intercalate or react with the cathode active materials and preferably, is similar to the alkali metal comprising the anode. In the case of an anode comprising lithium, suitable salts include $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, $LiSCN$, $LiO_3SCF_3$, $LiC_6F_5SO_3$, $LiO_2CCF_3$, $LiSO_6F$, $LiB(C_6H_5)_4$ and $LiCF_3SO_3$, and mixtures thereof.

Useful low viscosity solvents include esters, linear and cyclic ethers and dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy, 2-methoxyethane (EME), ethyl methyl carbonate, methyl propyl carbonate, ethyl propyl carbonate, diethyl carbonate, dipropyl carbonate, and mixtures thereof. Suitable high permittivity solvents include cyclic carbonates, cyclic esters, cyclic amides and a sulfoxide such as propylene carbonate (PC), ethylene carbonate (EC), butylene carbonate, acetonitrile, dimethyl sulfoxide, dimethyl formamide, dimethyl acetamide, γ-valerolactone, γ-butyrolactone (GBL), N-methyl-pyrrolidinone (NMP) and mixtures thereof. In the present invention, the preferred anode active material is lithium metal, the preferred cathode active material is SVO and the preferred electrolyte is 0.8M to 1.5M $LiAsF_6$ or $LiPF_6$ dissolved in a 50:50 mixture, by volume, of propylene carbonate and 1,2-dimethoxyethane.

The metallic casing may comprise materials such as stainless steel, mild steel, nickel-plated mild steel, titanium, tantalum or aluminum, but not limited thereto, so long as the metallic material is compatible for use with components of the cell. The cell header or lid comprises a metallic disc-shaped body with a first hole to accommodate the glass-to-metal seal/terminal pin feedthrough and a second hole fQr electrolyte filling. The glass used is of a corrosion resistant type having up to about 50% by weight silicon such as CABAL 12, TA 23, FUSITE 425 or FUSITE 435. The positive terminal pin feedthrough preferably comprises titanium although molybdenum, aluminum, nickel alloy, or stainless steel can also be used. The cell header is typically of a material similar to that of the casing. The positive terminal pin supported in the glass-to-metal seal is, in turn, supported by the header, which is welded to the casing containing the electrode assembly. The cell is thereafter filled with the electrolyte solution described hereinabove and hermetically sealed such as by close-welding a stainless steel ball over the fill hole, but not limited thereto.

It is appreciated that various modifications to the inventive concepts described herein may be apparent to those skilled in the art without departing from the spirit and the scope of the present invention defined by the hereinafter appended claims.

What is claimed is:
1. An electrochemical cell, which comprises:
a) a casing comprising a sidewall extending to an open end thereof;
b) a first electrode comprising first and second portions, wherein the first portion comprises a first current col- lector having first and second major sides supporting a first electrode active material, and wherein the second portion of the first electrode comprises the first electrode active material directly contacted to an inner surface of the casing sidewall serving as a first terminal for the first electrode;

c) a conductor extending from the first current collector comprising the first portion of the first electrode to either the inner surface of the casing sidewall or to the first electrode active material comprising the second portion of the first electrode directly contacted to the inner surface of the casing sidewall;

d) a second, counter electrode comprising a second current collector having third and fourth major sides supporting a second electrode active material, wherein the second electrode is connected to a second terminal electrically insulated from the first terminal;

e) a separator segregating the first and second electrodes from each other;

f) an electrolyte provided in the casing to activate the first and second electrodes; and g) a lid closing the open end of the casing.

2. The electrochemical cell of claim 1 wherein the first electrode is an anode electrode providing the cell having a case-negative design.

3. The electrochemical cell of claim 1 wherein the first electrode is a cathode electrode providing the cell having a case-positive design.

4. The electrochemical cell of claim 1 wherein the casing comprises spaced apart sidewalls and wherein the second portion of the first electrode comprises the first electrode active material directly contacted to an inner surface of at least one of the spaced apart casing sidewalls.

5. An electrochemical cell, which comprises:

a) a casing comprising a sidewall extending to an open end thereof;

b) an anode electrode comprising first and second anode portions, wherein the first anode portion comprises a anode current collector having first and second major sides supporting an anode active material, and wherein the second anode portion comprises the anode active material directly contacted to an inner surface of the casing serving as a terminal for the anode electrode;

c) a conductor extending from the first current collector comprising the first portion of the first electrode to either the inner surface of the casing sidewall or to the first electrode active material comprising the second portion of the first electrode directly contacted to the inner surface of the casing sidewall;

d) a cathode electrode comprising a cathode current collector having third and fourth major sides supporting a cathode active material, wherein the cathode is connected to a cathode terminal electrically insulated from the anode terminal;

e) a separator segregating the anode electrode from the cathode electrode;

f) an electrolyte provided in the casing to activate the anode and cathode electrodes; and h) a lid closing the open end of the casing.

6. The electrochemical cell of claim 5 wherein the anode and cathode electrodes are associated with each other in either a jellyroll or a prismatic electrode design.

7. The electrochemical cell of claim 5 wherein anode active material is lithium.

8. The electrochemical cell of claim 5 wherein the cathode active material is selected from the group consisting of silver vanadium oxide, copper silver vanadium oxide, fluorinated carbon, $C_2F$, $V_2O_5$, $MnO_2$, $LiCoO_2$, $LiNiO_2$, $LiMn_2O_4$, $TiS_2$, $CU_2S$, $FeS$, $FeS_2$, $Ag_2O$, $Ag_2O2$, $CuF_2$, $Ag_2CrO_4$, copper oxide, copper vanadium oxide, and mixtures thereof.

9. The electrochemical cell of claim 5 wherein the electrolyte comprises at least one nonaqueous solvent selected from the group consisting of tetrahydrofuran, methyl acetate, diglyme, trigylme, tetragylme, dimethyl carbonate, 1,2-dimethoxyethane, 1,2-diethoxyethane, 1-ethoxy, 2-methoxyethane, ethyl methyl carbonate, methyl propyl carbonate, ethyl propyl carbonate, diethyl carbonate, dipropyl carbonate, propylene carbonate, ethylene carbonate, butylene carbonate, acetonitrile, dimethyl sulfoxide, dimethyl formamide, dimethyl acetamide, γ-valerolactone, γ-butyrolactone, N-methyl-pyrrolidinone, and mixtures thereof.

10. The electrochemical cell of claim 5 wherein the electrolyte includes a lithium salt selected from the group consisting of $LiPF_6$, $LiBF_4$, $LiAsF_5$, $LiSbF_6$, $LiClO_4$, $LiO_2$, $LiAlCl_4$, $LiGaCl_4$, $LiC(SO_2CF_3)_3$, $LiN(SO_2CF_3)2$, $LiSCN$, $LiO_3SCF_3$, $LiC_6F_5SO_3$, $LiO_2CCF_3$, $LiSO_6F$, $LiB(C_6H_5)_4$ and $LiCF_3SO_3$, and mixtures thereof.

11. A method for providing an electrochemical cell, comprising the steps of:

a) providing a casing comprising a sidewall extending to an open end thereof;

b) providing a first electrode comprising first and second portions, including the steps of:

i) supporting a first electrode active material on first and second major sides of a first current collector to provide the first portion of the first electrode;

ii) directly contacting the first electrode active material to an inner surface of the casing sidewall to provide the second portion of the first electrode, the casing serving as a first terminal for the first electrode; and iii) extending a conductor from the first current collector comprising the first portion of the first electrode to either the inner surface of the casing sidewall or to the first electrode active material comprising the second portion of the first electrode directly contacted to the inner surface of the casing sidewall;

c) supporting a second electrode active material on third and fourth major sides of a second current collector, wherein the second electrode is connected to a second terminal electrically insulated from the first terminal;

d) segregating the first and second electrodes from each other with a separator;

e) activating the first and second electrodes with an electrolyte provided in the casing; and f) closing the open end of the casing with a lid.

12. The method of claim 11 wherein the first electrode is an anode electrode providing the cell having a case-negative design.

13. The method of claim 11 wherein the first electrode is a cathode electrode providing the cell having a case-positive design.

14. The method of claim 11 wherein the casing comprises spaced apart sidewalls and wherein the second portion of the first electrode comprises the first electrode active material directly contacted to an inner surface of at least one of the spaced apart casing sidewalls.

15. The electrochemical cell of claim 1 wherein the first electrode active material is contacted to at least one side of the first current collector with a portion of the first electrode active material extending beyond an edge thereof and being directly contacted to the inner surface of the casing sidewall.

16. The electrochemical cell of claim 5 wherein the anode active material is contacted to at least one side of the anode current collector with a portion of the anode active material extending beyond an edge thereof and being directly contacted to the inner surface of the casing.

17. The method of claim 11 including directly contacting the first electrode active material to at least one side of the first current collector with a portion of the first electrode active material extending beyond an edge thereof and directly contacting the extending portion of the first electrode active material to the inner surface of the casing.

* * * * *

UNITED STATES PATENT AND TRADEMARK OFFICE
CERTIFICATE OF CORRECTION

PATENT NO. : 7,108,942 B1　　　　　　　　　　　　　　　　　　　　　　　Page 1 of 1
APPLICATION NO. : 10/807358
DATED : September 19, 2006
INVENTOR(S) : Hong Gan and Esther S. Takeuchi It is certified that error appears in the above-identified patent and that said Letters Patent is hereby corrected as shown below:

Column 3, line 10 reads "IIB, IIIB, IVB, VB, VIIB, VIIB, and VIII"

should be --IIB, IIIB, IVB, VB, VIB, VIIB and VIII--

Column 3, line 48, reads "$Ag_{202}$"

should be --$Ag_2O_2$--

Column 5, line 16, reads "where n 1, 2, 3,"

should be --where n = 1, 2, 3,--

Column 6, line 43, reads "fQr"

should be --for--

Column 8, line 17, reads "$LiAsF_5$"

should be --$LiAsF_6$--

Column 8, line 18, reads "$LiN(SO_2CF_3)\ 2$"

should be --$LiN(SO_2CF_3)_2$--

Signed and Sealed this

Twelfth Day of December, 2006

JON W. DUDAS
*Director of the United States Patent and Trademark Office*